United States Patent [19]

Prado

[11] Patent Number: 5,405,914
[45] Date of Patent: Apr. 11, 1995

[54] PROCESS FOR IMPROVING THE COLOR OF SELECTIVELY HYDROGENATED BLOCK COPOLYMERS MODIFIED WITH ACID COMPOUNDS OR DERIVATIVES

[75] Inventor: Miguel Prado, Sugarland, Tex.

[73] Assignee: Shell Oil Company, Houston, Tex.

[21] Appl. No.: 99,022

[22] Filed: Jul. 29, 1993

[51] Int. Cl.$^6$ ............................................. C08F 267/04
[52] U.S. Cl. .................................... 525/285; 525/301; 525/338
[58] Field of Search ...................... 525/285, 338, 301

[56] References Cited

U.S. PATENT DOCUMENTS

Re. 27,145  6/1971  Jones .................................... 260/880
3,792,005  2/1974  Harlan .
4,134,928  1/1979  Moczygemba .

OTHER PUBLICATIONS

U. K. Search Report dated 4 Nov. 1994.

Primary Examiner—Peter A. Szekely
Assistant Examiner—Edward J. Cain
Attorney, Agent, or Firm—Donald F. Haas

[57] ABSTRACT

A process for improving the color of selectively hydrogenated block copolymers modified with acid compound or derivatives thereof which comprises:

(a) anionically polymerizing at least one conjugated diene, and, optionally, at least one vinyl aromatic hydrocarbon, to produce a block copolymer, (b) selectively hydrogenating the block copolymer, (c) subjecting the block copolymer to an acid wash, (d) subjecting the acid washed block copolymer to high efficiency water washing at a residence time of not less than 50 minutes and a water to polymer cement weight ratio of more than 0.2, and (e) grafting an acid compound or a derivative thereof onto the block copolymer.

3 Claims, No Drawings

PROCESS FOR IMPROVING THE COLOR OF SELECTIVELY HYDROGENATED BLOCK COPOLYMERS MODIFIED WITH ACID COMPOUNDS OR DERIVATIVES

BACKGROUND OF THE INVENTION

The present invention relates to low color block copolymers modified with acid compounds. More specifically, the invention relates to a process for improving the color of block copolymers of conjugated dienes and vinyl aromatic hydrocarbons to which at least one acid compound had been grafted.

U.S. Pat. No. 4,578,429 discloses selectively hydrogenated block copolymers of conjugated dienes and vinyl aromatic hydrocarbons which have been modified with acid compounds or derivatives thereof. Such polymers have been found to be useful to increase adhesion to fibers and fillers, substrates in adhesives, sealants and coatings, decorations such as printing inks, paints, primers and metals, etc. First, the block copolymer is made according to a process such as described in U.S. Pat. No. Re. 27,145. After hydrogenation, the polymer is subjected to an acid wash with sulfuric acid or phosphoric acid to oxidize the hydrogenation catalyst and facilitate extraction. Then, an acid group or a derivative, such as maleic anhydride, is grafted onto the polymer by a reaction of the acid group with the polymer in the melt.

While these polymers have been found to be quite useful as described above, their usefulness has been limited because they tend to develop a yellow color. The color makes them unacceptable to many customers for use in films, color-matched compounds, and clear applications. Thus, it would be advantageous to be able to produce such functionalized block copolymers which permanently exhibit a low color.

SUMMARY OF THE INVENTION

The present invention provides a process to provide low color block copolymers of conjugated dienes and vinyl aromatic hydrocarbons which have been modified with acid compounds or derivatives thereof. The polymers are produced by first anionically polymerizing the block copolymers and then selectively hydrogenating them. The block copolymer is then subjected to an acid wash in order to oxidize and extract the hydrogenation catalyst. The next step is grafting of the acid or derivative group onto the block copolymer.

I have found that the color problem of such block copolymers is caused by the presence of residual acid anions in the polymer. For instance, if sulfuric acid is used in the acid wash, residual sulfate anions will be left behind in the polymer. These sulfates appear to interfere with the color of the functionalized polymers, probably by reacting with peroxide or maleic anhydride or simply degrading the polymer itself. In my invention, the color problem is eliminated by adding, after the acid wash, a high efficiency water washing step or series of steps. Thus, the residence time of the polymer in the washing step is significantly raised and the volume ratio of the water to polymer cement is significantly increased. Preferably, the residence time should be at least 70 minutes and the volume ratio of the water to the polymer cement should be at least 0.2.

DETAILED DESCRIPTION OF THE INVENTION

Block copolymers of conjugated dienes, including optional and preferred vinyl aromatic hydrocarbons, which may be utilized include any of those which exhibit elastomeric properties. Such block copolymers may be multiblock copolymers of varying structures containing various ratios of conjugated dienes to vinyl aromatic hydrocarbons and may be linear, radial, or star in configuration. Such block copolymers are described in detail in U.S. Pat. No. 4,578,429 which is herein incorporated by reference.

The block copolymers may be produced by any well known block polymerization or copolymerization procedures including the well known sequential addition of monomer techniques, incremental addition of monomer technique or a coupling technique as illustrated in, for example, U.S. Pat. Nos. 3,251,905, 3,390,207, 3,598,887, and 4,219,627, the disclosures of which are herein incorporated by reference. Conjugated dienes which may be utilized are generally those having from four to 20 carbon atoms including butadiene and isoprene which are preferred. Vinyl aromatic hydrocarbons which may be utilized include styrene and styrene derivatives.

The hydrogenation of these polymers and copolymers may be carried out by a variety of well established processes including hydrogenation in the presence of such metals as Raney Nickel, noble metals such as platinum, palladium and the like and soluble transition metal catalysts. Such processes are disclosed in U.S. Pat. Nos. 3,113,986, 4,226,952, and 5,039,755, all of which are herein incorporated by reference.

In general, any materials having the ability to react with the base polymer in free radical initiated reactions are operable for the purposes of the invention. In order to incorporate functional groups into the base polymer, monomers capable of reacting with the base polymer, for example, in solution or in the melt by free radical mechanism are necessary. Monomers may be polymerizable or nonpolymerizable but preferred monomers are nonpolymerizable or slowly polymerizing. The monomers useful herein are described in more detail in U.S. Pat. No. 4,578,429 which is herein incorporated by reference.

The class of preferred monomers for graft polymers within the scope of this invention have one or more functional groups or their derivatives such as carboxylic acid groups and their salts, anhydrides, esters, imide groups, amide groups, acid chlorides and the like in addition to at least one point of unsaturation. These functionalities can be subsequently reacted with other modifying materials to produce new functional groups.

The grafted polymer will usually contain from 0.02 to 20, preferably 0.1 to 10, and most preferably 0.2 to 5, weight percent of grafted portion. The preferred modifying monomers are unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives of said acids. Examples include maleic acid, fumaric acid, acrylic acid, methacrylic acid, maleic anhydride, and acrylonitrile. Other examples are given in the aforementioned U.S. Pat. No. 4,578,429.

The modified block copolymer according to the present invention may be prepared by graft-reacting an acid moiety or its derivative with one of the block copolymers of the present invention wherein said graft reaction is carried out by melt-mixing said block copolymer and said acid moiety in the presence of a free radical initiator. The free radical initiator is preferably an organic peroxygen compound.

Reaction temperatures and pressures would be sufficient to melt the reactants and also sufficient to thermally decompose the free radical initiator to form the free radical. Typical reaction conditions can be obtained by using a screw type extruder to mix, melt, and convey the reactants and to heat the reactant mixture to the desired reaction temperature which may vary between wide limits such as from 75° C. to 450° C. This process is described in more detail in U.S. Pat. No. 4,578,429 which is herein incorporated by reference.

During the hydrogenation of the precursor polymer, it is subjected to an acid wash in order to oxidize and extract the hydrogenation catalyst. Generally, the acid wash is carried out with sulfuric acid because of its low cost and availability. However, phosphoric acid can also be used to advantage.

I have found that the use of such an acid wash causes a color problem when the polymer is functionalized in the extruder. Residual acid anions, i.e. sulfates, left in the polymer interfere with the color of the functionalized polymers, probably by reacting with the peroxide or the functionalizing agent such as maleic anhydride or perhaps they contribute to degradation of the polymer. In any case, I have determined that it is the presence of these sulfates which causes the color problem. If the sulfates are not present or are removed prior to the functionalization step, the color of the polymer is much improved. The same is true with respect to phosphoric acid residue which may be left in the polymer should the polymer be washed with phosphoric acid.

In order to achieve the advantages of the present invention, the acid wash residue, i.e., sulfates, etc., must be reduced in the polymers of the present invention to a level of 50 parts per million or less. Preferably, the level of this undesirable material is reduced to less than 30 parts per million. Water washing of these block copolymer precursors has been used in commercial practice. Generally, the polymer is not water washed because the presence of sulfates is not a problem for many applications. However, some applications require a mild water wash while not unnecessarily increasing the cost of producing the polymer. Furthermore, the volume ratio of the water to the polymer, or more specifically the polymer cement (the polymer dissolved in its solvent), was not more than 0.2–0.3 and the residence time was less than 70 minutes.

I have found that a much higher efficiency water washing process is necessary to solve the color problem with this type of polymer. The residence time of the precursor polymer in the water washing step can be no less than 50 minutes if one desires to decrease the undesirable residue, sulfate, content to less than 50 parts per million. The volume ratio of water to cement must be more than 0.3 if those results are to be achieved. Good results can also be achieved if the residence time is at least 70 minutes and the water to cement ratio is at least 0.2.

EXAMPLE 1

A hydrogenated styrene-butadiene-styrene block copolymer cyclohexane solution was washed with dilute sulfuric acid in the presence of oxygen. The hydrogenation catalyst was thereby reduced to a species that was easily extractable into the dilute sulfuric acid phase.

Once the hydrogenation catalyst residue was acid-extracted from the polymer solution, it was submitted to a two stage water wash and neutralization. In the first stage, the polymer solution was washed with water at a water to polymer solution ratio of 0.25. The residence time was 53 minutes. In the second stage the polymer solution was neutralized with ammonia and washed with water at a water to polymer solution ratio of 0.12 and a residence time of 21 minutes. The time weighted average water to polymer solution ratio for both stages was 0.22.

After the polymer was separated from the solvent, the amount of sulfate in the polymer was determined to be 20 ppm.

Maleic anhydride was then grafted onto the polymer in a corotating, fully intermeshing, extruder. Lupersol 101 peroxide initiator was used. Two percent of the maleic anhydride was grafted onto the polymer. The yellowness index of the polymer was 8.

EXAMPLE 2

Another sample of the polymer of Example 1 was made according to the procedure of Example 1 except that water washing was stopped before the steady state optimum rates of this invention had been reached. Thus, this water wash is comparable to the mild water wash of prior practice described above. The polymer before grafting had a sulfate content of 165 ppm and after grafting, it had a yellowness index of 29.

EXAMPLE 3

The procedure of Example 1 was followed except that the residence time was only 67 minutes. The sulfate level was 100 ppm and the yellowness index was 22.

I claim:

1. A process for improving the color of selectively hydrogenated block copolymers modified with an acid compound or a derivative thereof which comprises:
   (a) anionically polymerizing at least one conjugated diene, and, optionally, at least one vinyl aromatic hydrocarbon, to produce a block copolymer,
   (b) selectively hydrogenating the block copolymer,
   (c) subjecting the block copolymer to an acid wash,
   (d) subjecting the acid washed block copolymer to high efficiency water washing at a residence time of not less than 50 minutes and a water to polymer cement volume ratio of more than 0.3, and
   (e) grafting an acid compound or a derivative thereof onto the block copolymer.

2. A process for improving the color of selectively hydrogenated block copolymers modified with acid compound or derivative thereof which comprises:
   (a) anionically polymerizing at least one conjugated diene, and, optionally, at least one vinyl aromatic hydrocarbon, to produce a block copolymer,
   (b) selectively hydrogenating the block copolymer,
   (c) subjecting the block copolymer to an acid wash,
   (d) subjecting the acid washed block copolymer to high efficiency water washing at a residence time of not less than 70 minutes and a water to polymer cement volume ratio of more than 0.2, and
   (e) grafting an acid compound or a derivative thereof onto the block copolymer.

3. The process of claim 2 wherein the residence time is not less than 70 minutes and the water to polymer cement weight ratio is not less than 0.3.

* * * * *